June 25, 1957 J. LUCKHARDT 2,796,918
ARTICLE OF REPOSE FOR SUPPORTING THE BODY OF A PERSON
Filed Sept. 15, 1954

INVENTOR.
JOHANNES LUCKHARDT
BY
ATTORNEY 2,796,918
Patented June 25, 1957

2,796,918
ARTICLE OF REPOSE FOR SUPPORTING THE BODY OF A PERSON

Johannes Luckhardt, Berlin-Dahlem, Germany; Wassili J. F. Luckhardt, Berlin-Dahlem, Germany, sole heir of said Johannes Luckhardt, deceased, assignor to Norman P. Martin and Otto L. Walker, Lake Worth, Fla., as trustees of Iota Trust Application September 15, 1954, Serial No. 456,270

5 Claims. (Cl. 155—116)

This invention relates to articles of furniture and more particularly to articles of repose for supporting the body of a person, wherein the movements of a movable seat and a movable back-rest are coordinated with each other.

An object of the invention is to provide an article of repose of above described type with a mechanism for coordinating the movements of the back-rest and the seat with each other, which may be readily manufactured.

Another object of the invention is to provide a seat for motor vehicles, wherein the seat member and the back-rest member may be brought into reclined positions.

Figure 1:
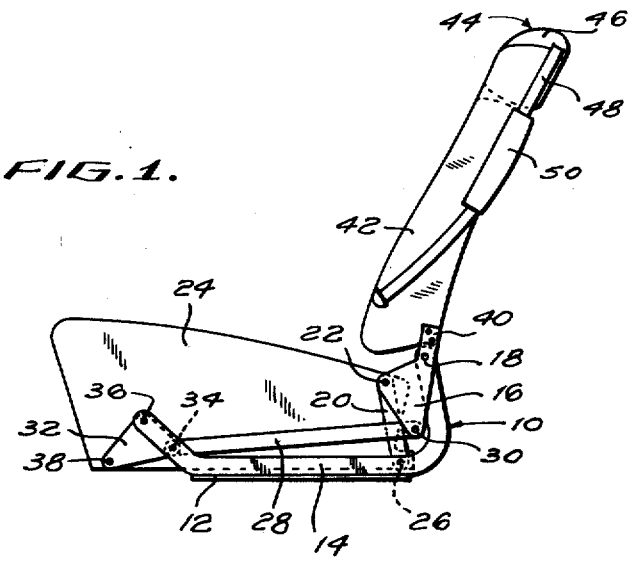
Figure 2:
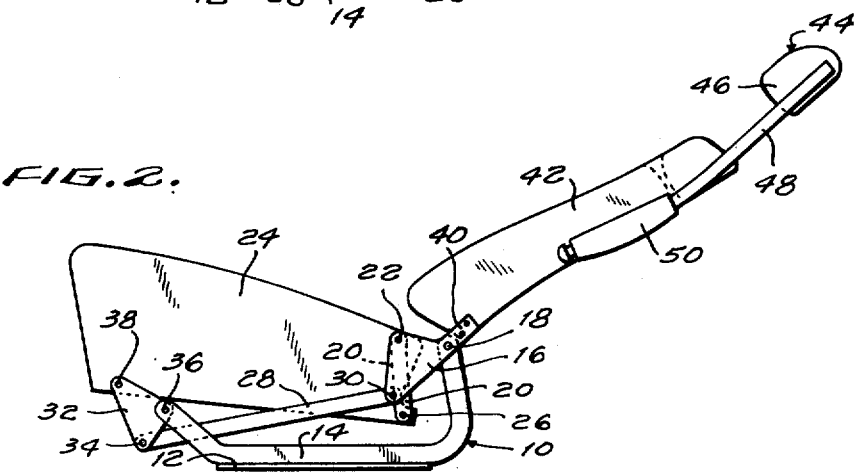
Figure 3:
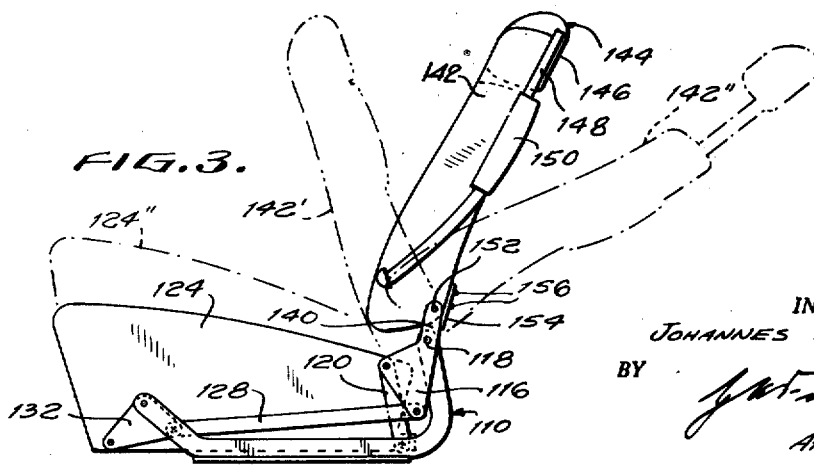

Other objects and structural details of the invention will be apparent from the following description when read in conjunction with the accompanying drawings forming part of this specification, wherein:

Fig. 1 is a side elevational view of a seat for a motor vehicle according to the invention, Fig. 2 is a side elevational view of the seat shown in Fig. 1, wherein, however, the movable parts of the seat are in the reclined position, and Fig. 3 is a side elevational view of another embodiment of a seat for a motor vehicle according to the invention.

Referring now to the drawings, 10 generally indicates the support of a seat for a motor vehicle. The support comprises a base 12 and a bent iron 14 (only one being shown) on each side of the seat. The bent irons 14 are secured to the base 12 in any suitable manner. The base 12 may be attached to the floor of the motor vehicle. On each side of the chair a plate or link elements 16 is swingably mounted on the support 10 at 18. The upper end of a connecting link 20 is pivoted to said plate 16 at 22. The lower end of said connecting link 20 is pivoted to the lower rear portion of a seat 24 at 26.

The rear end of another connecting link 28 is pivoted at 30 to the plate 16. The front end of said second connecting link 28 is pivoted to a plate or link element 32 at 34. Said plate 32 is swingably mounted on the support 10 at 36. Furthermore, said plate 32 is pivoted to the lower front portion of the seat 24 at 38. When the members of the seat are in the sitting position shown in Fig. 1, the connecting links 20 and 28 cross each other.

The plate 16 has an extension 40 projecting from the pivotal connection. On each side of the seat a back-rest 42 is rigidly connected with the extension 40 of a plate 16 by means of screws.

A head-rest generally indicated by 44 comprises a center portion 46 and two rods 48 (only one being shown) projecting laterally and downwardly from the center portion 46. Each of the rods 48 is slidably engaged with a sleeve 50 mounted on the back-rest 42.

When a person resting on the seat leans the weight of his body against the back-rest 42, the plate 16 rigidly connected with the back-rest 42 is swung about its pivot 18 so that the back-rest 42 reaches the reclined position shown in Fig. 2. At the same time the seat member 42 is brought into the reclined position shown in Fig. 2 by means of the linkage 16, 20, 28, 32 described above. When the back-rest is in the reclined position shown in Fig. 2, the user of the seat may bring the head-rest 44 into the propelled position by pushing the rods 48 by hand.

According to the embodiment shown in Fig. 3, the seat 124 is again movably mounted on the support 110 by means of the linkage 116, 120, 128, 132. In contrast to Figs. 1 and 2, however, the back-rest 142 is not rigid with the plate 116 of said linkage. According to Fig. 3 the back-rest 142 is swingably mounted at 152 on the extension 140 of the plate 116. An abutment 154 rigidly connected with the back-rest 142 by screws 156 or the like is arranged for abutting cooperation with an abutting surface on the extension 140 of the plate 116.

A head-rest generally indicated by 144 includes the center portion 146 and a rod 148 on each side of the article. Each rod 148 is slidably engaged with a sleeve 140 attached to the back-rest 142.

When the seat according to the invention is used as a front seat in a two-door car and a person wishes to enter the car for occupying a rear seat, the back-rest 142 may be readily swung about its pivot 152 into the forwardly inclined position 142′. During this forward movement of the back-rest 142 the abutment 154 is disengaged from the extension 140 of the plate 116.

When a person occupying a seat according to the invention wishes to bring the movable members of the seat into a reclined position 124″, 142″, the back-rest 142 is urged backwardly whereby the abutment 154 being engaged with the extension 140 of the plate 116 causes a swinging movement of said plate 116 about its pivot 118 which results in corresponding movements of the links of the linkage 116, 120, 128, 132 connected with the seat 124.

I have described preferred embodiments of my invention, but it is understood that this disclosure is for the purpose of illustration and that various omissions or changes in shape, proportion and arrangement of parts, as well as the substitution of equivalent elements for those herein shown and described may be made without departing from the spirit and scope of the invention as set forth in the appended claims.

For example the seats according to the invention could be provided with stopping means for limiting the sitting and/or reclined positions of its movable members.

Furthermore, a locking device could be arranged for holding the movable members of the seat in any desired position.

What I claim is:

1. An article of repose for supporting the body of a person, comprising: a support, a seat-member, a first link element swingably mounted at the rear end portion of said support, a second link element swingably mounted at the front end portion of said support, a first connecting link pivoted at different regions thereof to said first link element and to said second link element at points below the plane of the pivotal connections of said link elements with said support, a second connecting link pivoted at different regions thereof to said first link element and to the rear end portion of said seat member, the pivotal connection of said second connecting link with said first link element being in a plane above the plane of the pivotal connection of said second connecting link with said seat, said second link element being pivoted to the front portion of said seat member, and a back-rest, said back-rest being in operative engagement with said first link element.

2. In an article of repose as claimed in claim 1, said back-rest being rigid with said first link element.

3. In an article of repose as claimed in claim 1, said second connecting link being pivoted to the lower portion of said seat member.

4. In an article of repose as claimed in claim 1, said two connecting links crossing each other when the movable members of the article are in the sitting position.

5. In an article of repose as claimed in claim 1, said back-rest being swingably mounted on said first link element, and disengageable cooperating abutting means arranged on said back-rest and said first link element.

References Cited in the file of this patent

UNITED STATES PATENTS

| | | |
|---|---|---|
| 73,782 | Chiles | Jan. 28, 1868 |
| 2,433,521 | Lorenz | Dec. 30, 1947 |
| 2,478,770 | Lorenz | Aug. 9, 1949 |
| 2,615,496 | Lorenz | Oct. 28, 1952 |

FOREIGN PATENTS

| | | |
|---|---|---|
| 501,665 | Canada | Apr. 20, 1954 |

UNITED STATES PATENT OFFICE

CERTIFICATE OF CORRECTION

Patent No. 2,796,918 June 25, 1957

Johannes Luckhardt

It is hereby certified that error appears in the above numbered patent requiring correction and that the said Letters Patent should read as corrected below.

In the grant, lines 3 to 5, for "assignor to Norman P. Martin and Otto L. Walker, of Lake Worth, Florida, as trustees of Iota Trust," read -- assignor to Norman P. Martin and Otto L. Walter, of Lake Worth, Florida, as trustees of Iota Trust, --; lines 14 and 15, for "Norman P. Martin and Otto L. Walker, as trustees of Iota Trust, their successors or assigns" read -- Norman P. Martin and Otto L. Walter, as trustees of Iota Trust, their successors or assigns --; in the heading to the printed specification, lines 6 to 8, for "assignor to Norman P. Martin and Otto L. Walker, Lake Worth, Fla., as trustees of Iota Trust" read -- assignor to Norman P. Martin and Otto L. Walter, Lake Worth, Fla., as trustees of Iota Trust --.

Signed and sealed this 29th day of October 1957.

(SEAL)
Attest:
KARL H. AXLINE

Attesting Officer

ROBERT C. WATSON
Commissioner of Patents